(No Model.)  2 Sheets—Sheet 1.
F. E. MERTENS.
PIPE AND HOSE COUPLING.
No. 299,827. Patented June 3, 1884.
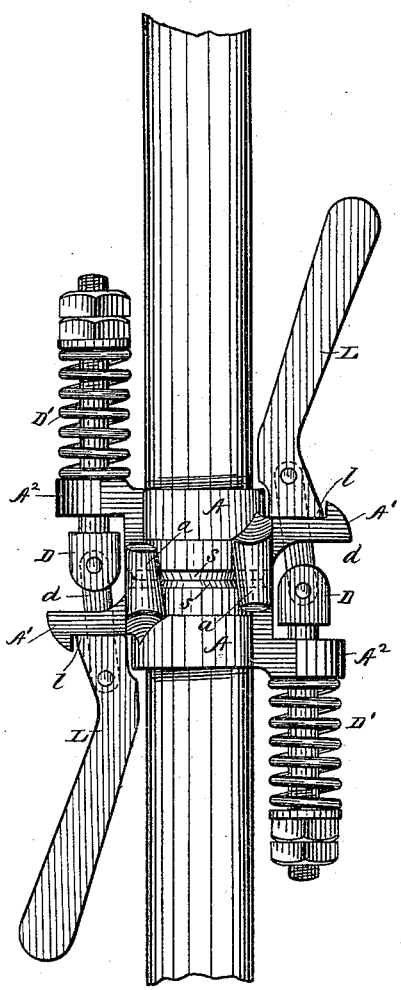
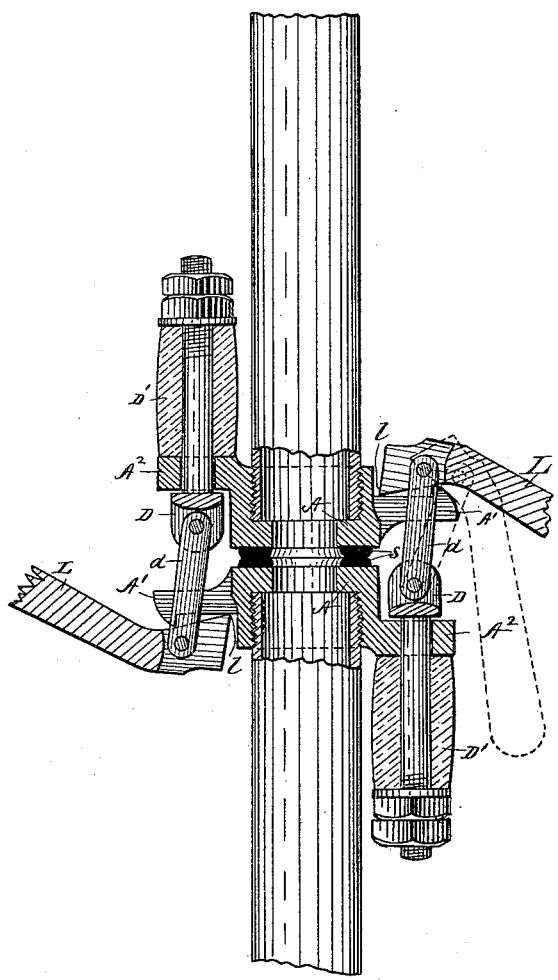
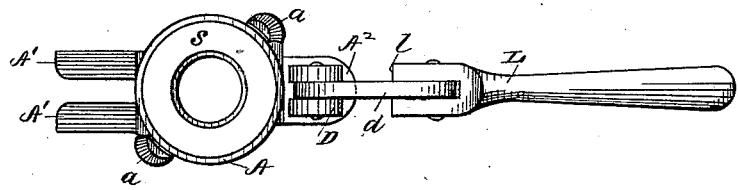
Witnesses.
W. R. Edler
E. Reinmuth
Inventor
F. E. Mertens.
Per Hallock & Halleck
Att'ys (No Model.) 2 Sheets—Sheet 2.

F. E. MERTENS.
PIPE AND HOSE COUPLING.

No. 299,827. Patented June 3, 1884.

Witnesses
W. R. Edelen
E. Remmuth

Inventor
F. E. Mertens
Per Hallock & Hallock
Att'ys

UNITED STATES PATENT OFFICE.

FREDERICK E. MERTENS, OF ERIE, PENNSYLVANIA.

PIPE AND HOSE COUPLING.

SPECIFICATION forming part of Letters Patent No. 299,827, dated June 3, 1884.

Application filed November 2, 1883. (No model.)

*To all whom it may concern:*

Be it known that I, FREDERICK E. MERTENS, a citizen of the United States, residing at Erie, in the county of Erie and State of Pennsylvania, have invented certain new and useful Improvements in Pipe and Hose Couplings; and I do hereby declare the following to be a full, clear, and exact description of the invention, such as will enable others skilled in the art to which it appertains to make and use the same.

This invention relates to means for coupling pipes, hose, &c.

The object of the invention is to provide a coupling device which can be set or loosened quickly, and will, when set, prevent the escape of the contents of the pipe, even if it be confined under very great pressure.

My device is intended particularly for coupling steam and compressed-air conduits, especially those used on railroad-trains for heating purposes and for operating the air-brakes; but of course its use is not at all limited to such pipes, and it will be found of value in coupling hose for fire-engines when rapid work is required and the water is under great pressure.

Figure 4:
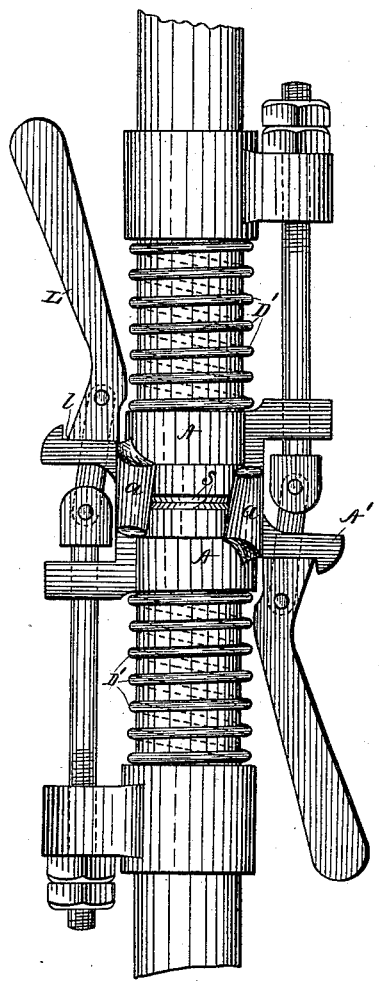
Figure 5:
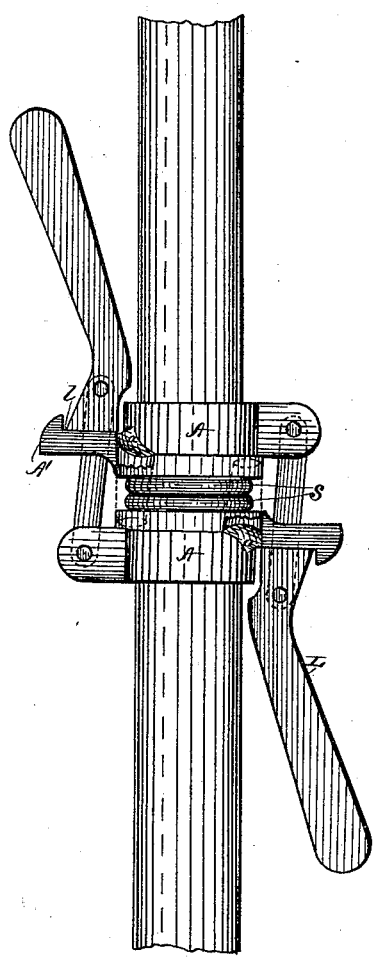

My device is shown in the accompanying drawings, as follows:

Figure 1 is an elevation view, and shows the coupling set. Fig. 2 shows the parts partly in section and the coupling not set. Fig. 3 is an end view of one of the pipe-sections, and shows the coupling-lever lying off at one side. Figs. 4 and 5 show modifications in the construction, as will appear hereinafter.

The construction is as follows: On the ends of the sections to be coupled are heads A, with means for being securely fastened to the pipes or hose. On the abutting faces of these heads are seats S, which may be of metal, hard rubber, or any suitable material. These seats are of course so faced as to form a tight joint when they are closely pressed together. Projecting from in front of the heads are guide-horns $a$ $a$, which insure the rapid adjustment of the two seats S squarely upon each other. On each head is a claw-catch, A', and opposite it a bearing-lug, A². Adjusted upon each bearing-lug A² is a draw-bar, D, and spring D', and connected with each draw-bar by links $d$ is a cam-lever, L. The claw-catch A' of one head is placed opposite the lug A² of the other head when the two heads are set together, and the links $d$ are entered between the prongs of the claw, so that the cam-levers can bear upon the opposite side of the claw-catch. (This position is clearly shown in Fig. 2.) Then, by throwing the levers over into the position shown in Fig. 1, the springs D' are so compressed as to firmly hold the two seats S together and form a tight coupling. In Fig. 2 the springs D' are shown as made of rubber. In Fig. 4 the springs D' are shown on the pipe in place of being on the draw-bars, as in Figs. 1 and 2. In Fig. 5 the seats S are shown made of soft rubber and of sufficient thickness to serve as springs, and the springs D' are omitted. These modifications may be made when desired; but I consider the construction shown in Figs. 1 and 2 as preferable for most purposes, although that shown in Fig. 5 will often be found desirable.

What I claim as new is—

1. In a pipe or hose coupling, the combination of the heads A A, having bearing-lugs A' A' and A² A², connected together by a link, with the cam-levers L L, adjusted substantially as shown, to act upon said bearings and against springs, substantially as shown.

2. In a pipe or hose coupler, the combination, substantially as shown, of the heads A A, having bearing-lugs A' A' and A² A², cam-levers L L, draw-bars D D, links $d$ $d$, and springs D' D', said parts being arranged to operate together substantially as shown.

3. In a pipe or hose coupling, substantially as shown, the heads A A, provided with guide horns or lugs $a$ $a$, projecting in front of the seating faces of said heads, and means, substantially as described, for fastening the heads together, for the purpose set forth.

4. In a pipe or hose coupling, substantially as shown, the combination, with the heads A A, of the lugs or projections A' A' A² A², the guide horns or lugs $a a a a$, the seats S S, draw-bars D D, links $d$ $d$, springs D' D', and levers L L, all substantially as and for the purposes named.

In testimony whereof I affix my signature in presence of two witnesses.

FRED. E. MERTENS.

Witnesses:
 JNO. K. HALLOCK,
 ROBT. H. PORTER.